Sept. 18, 1923.

K. W. THALHAMMER 1,468,091

DISSOLVE MECHANISM FOR CAMERAS

Filed Oct. 29, 1920    4 Sheets-Sheet 1

INVENTOR.
Karl W. Thalhammer
BY
ATTORNEY

Sept. 18, 1923.

K. W. THALHAMMER

DISSOLVE MECHANISM FOR CAMERAS

Filed Oct. 29, 1920  4 Sheets-Sheet 2

1,468,091

INVENTOR.
Karl W. Thalhammer
BY Frederick W. Ryan
ATTORNEY

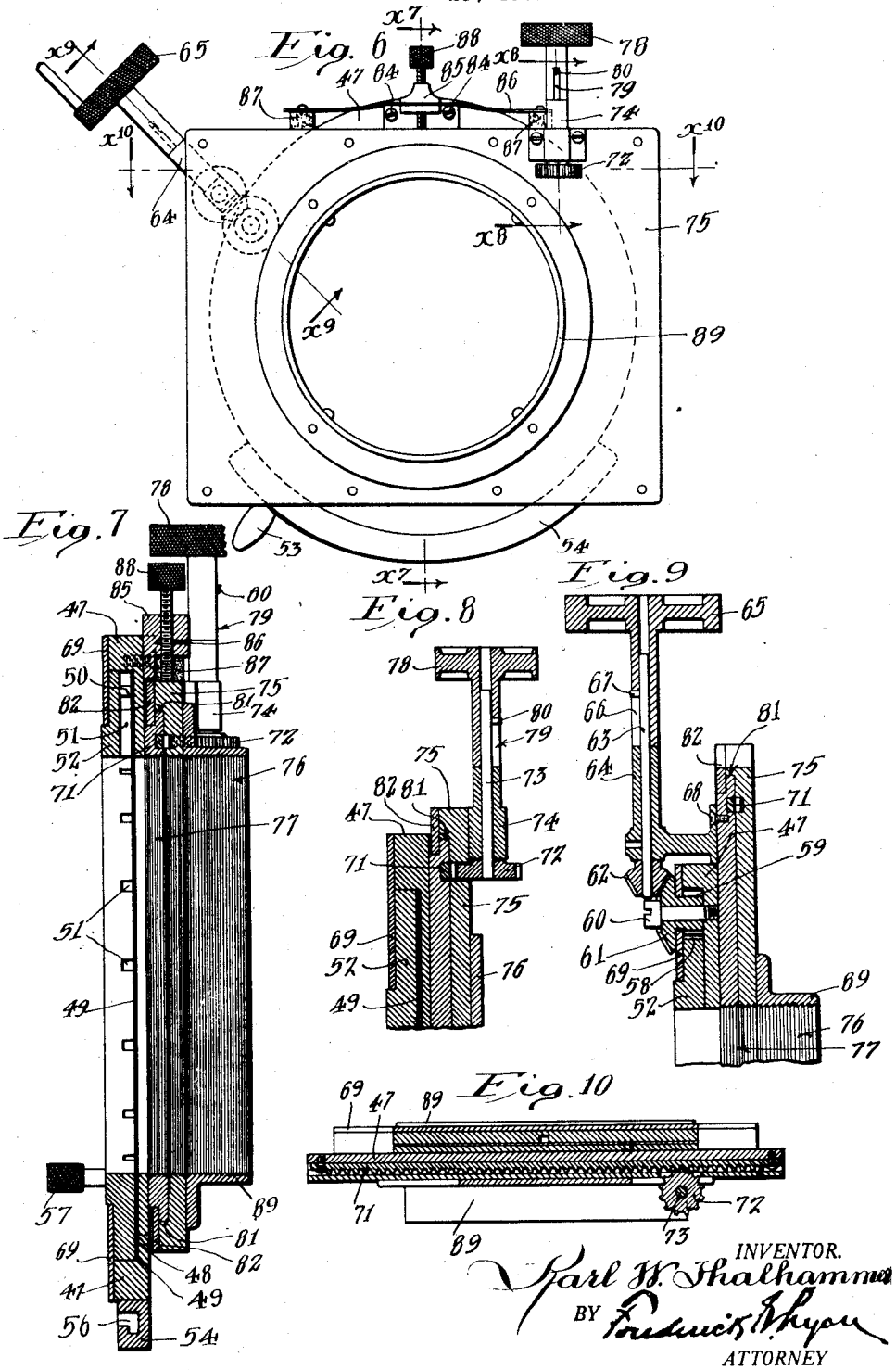

Sept. 18, 1923.  K. W. THALHAMMER  1,468,091
DISSOLVE MECHANISM FOR CAMERAS
Filed Oct. 29, 1920   4 Sheets-Sheet 4

Inventor;
Karl W. Thalhammer
By _____ attys

Patented Sept. 18, 1923.

1,468,091

UNITED STATES PATENT OFFICE.

KARL W. THALHAMMER, OF LOS ANGELES, CALIFORNIA.

DISSOLVE MECHANISM FOR CAMERAS.

Application filed October 29, 1920. Serial No. 420,424.

*To all whom it may concern:*

Be it known that I, KARL W. THALHAMMER, a citizen of Austria, and a resident of Los Angeles, county of Los Angeles, State of California, have invented a new and useful Dissolve Mechanism for Cameras, of which the following is a specification.

This invention relates to an attachment for a camera for producing dissolving effects. "Dissolves" or "fade-ins" and "fade-outs" are produced in motion picture photography by using an iris diaphragm, the diaphragm being gradually opened to increase the illumination of the film for fade-ins and being gradually closed to decrease the illumination for fade-outs.

An object of this invention is to effect the dissolves slowly or rapidly in a convenient manner.

The dissolves have heretofore been effected for different portions of the "frames" by shifting the diaphragm to positions eccentric of the axis of the camera lens; and an object of this invention is to conveniently effect such shifting.

Another object is to provide means for shifting the diaphragm carriage and to rotate the carriage mount so as to bring the axis of the diaphragm into various positions relative to the axis of the lens.

Another object is to provide a construction which will yieldingly hold the diaphragm carriage against movement and at the same time will permit the carriage to be moved by the carriage operating means, thus preventing any looseness of the carriage in the various positions of adjustment.

Other objects and advantages will appear hereinafter.

The accompanying drawings illustrate the invention:

Figure 5A:
Fig. 5 is a vertical section on line indicated by $X^5$—$X^5$ Fig. 2, a portion of the bracket also being shown.
Figure 5:
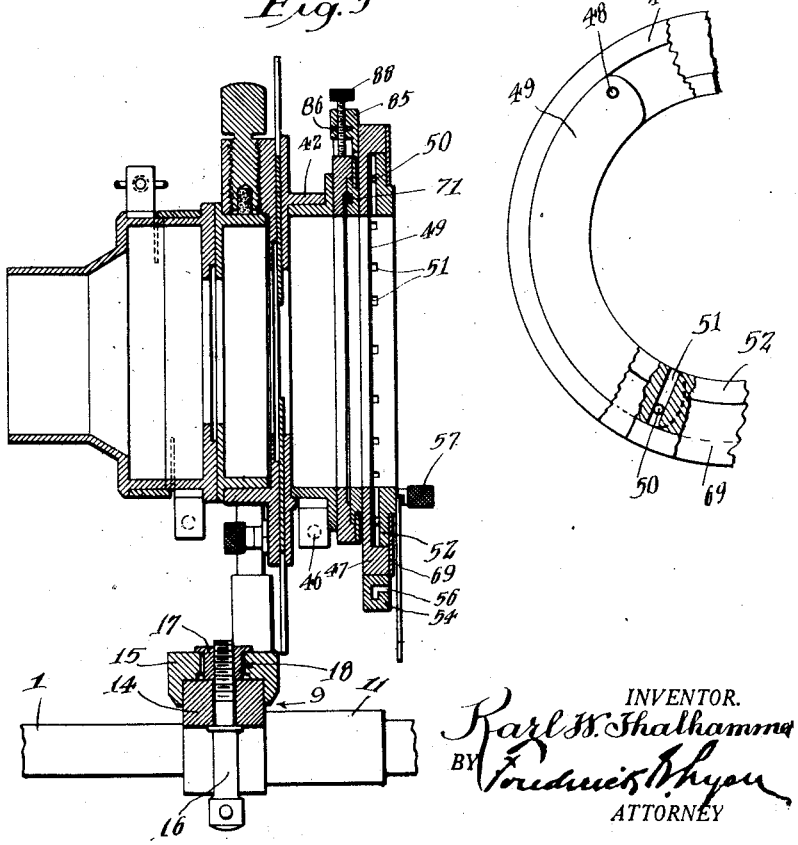

Fig. 5$^a$ is a detail showing one of the diaphragm leaves and a fragment of the operating ring.

Fig. 6 is a rear view of the diaphragm box.

Fig. 7 is an enlarged vertical section on line indicated by $X^7$—$X^7$ Fig. 6.

Fig. 8 is a vertical section on line indicated by $X^8$—$X^8$ Fig. 6.

Fig. 9 is a sectional elevation on line indicated by $X^9$—$X^9$ Fig. 6.

Fig. 10 is a plan section on line indicated by $X^{10}$—$X^{10}$ Fig. 6.

Figure 11:
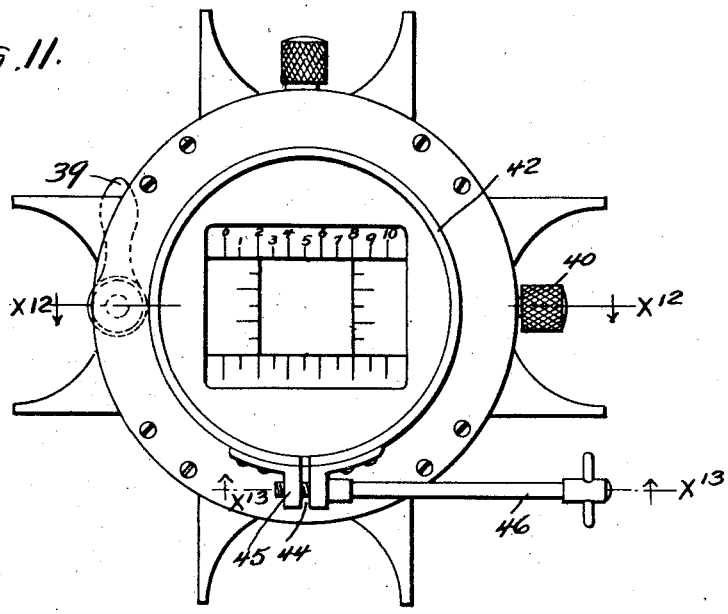

Fig. 11 is a front elevation of the mat box, portions of two of the mats being broken away to contract the view.

Figure 12:
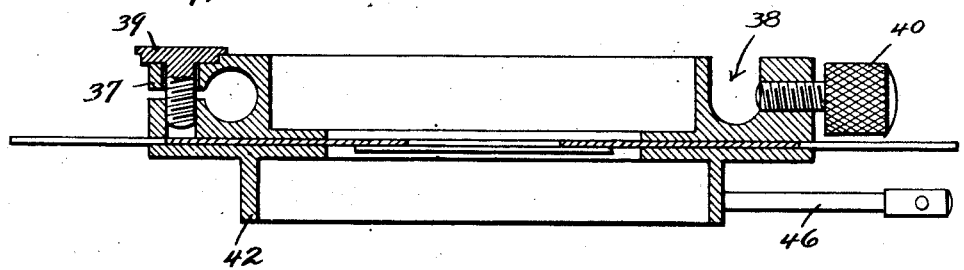

Fig. 12 is an enlarged plan section on line indicated by $X^{12}$—$X^{12}$ Fig. 11.

Figure 13:
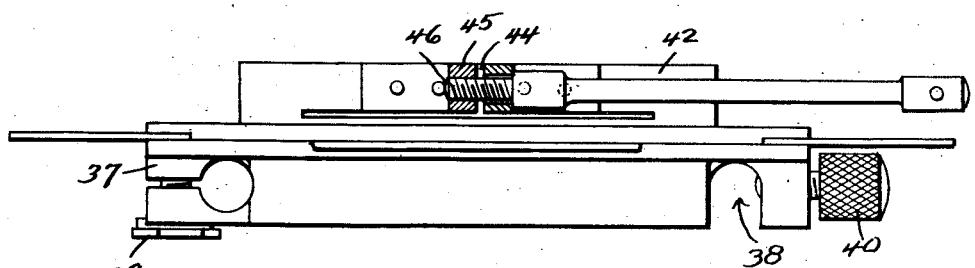

Fig. 13 is an enlarged inverted plan view of Fig. 11, partly in section on line indicated by $X^{13}$—$X^{13}$ thereon.

The invention comprises four principal groups of elements, the groups being a bracket $a$, a mat box $b$, an iris diaphragm $c$ and a mask box $d$, all capable of functioning together to produce the desired results. The groups $b$, $c$, and $d$ of elements may also function separately, which is to say that any one of the groups $b$, $c$, $d$ could be employed with the camera by suitably mounting it in front of the lens of the camera.

The groups $a$ and $c$ mentioned above will be described in the order named, the first to be described being the bracket $a$. The bracket comprises horizontally disposed parallel rods 1 mounted in a U-shape jaw 2 adapted to extend beneath the head 3 of a tripod indicated in general by the character 4. The rods 1 are detachably secured in the jaw 2 by set screws 5. The jaw is provided with a plane face 6 to engage one edge of the head 3 and is provided above said face with an overhanging lip 7 adapted to rest upon the upper surface of the head 3. Opposite to the face 6 the jaw is provided with a clamping screw 8 adapted to engage the opposite edge of the table 3. The tripod head 3 is of an ordinary type for supporting the camera which is indicated in general in Fig. 1 by the character *e*. The tripod 4 and camera *e* form no part of the present invention, and are merely shown to make clear how the invention is attached thereto.

Shiftably mounted on the rods 1 is a slide 9 carrying standards 10. The slide 9 comprises sleeves 11 which slide on the rods 1, one of said sleeves being provided with a kerf 12 and a clamping screw 13 to contract a portion of said sleeve on the associated rod, thus to fix the slide 9 in any position to which it may be adjusted on the rods. The slide 9 comprises a lower member 14 and an upper member 15 which is laterally shiftable on the lower member. Extending through the member 14 is a clamping screw 16 which engages a nut 17 slidably fitting in a longitudinal slot 18 in the upper member 15, said nut also engaging the upper face of the member 15 so that tightening of the screw 16 will bind the member 15 upon the member 14 to hold said member in fixed position relative to member 14. The standards 10 are fixed in the upper member 15 of the slide.

Preferably one of the rods 1 is provided with graduations 19 at known distances apart, and on said rod is mounted a stop 20 held in adjusted position by a set screw 21. To adjust the slide 9 to any definite position along the rods 1, the stop 20 will be moved so that its front face registers with one of the graduations 19, this being easy because there is very little friction between the stop and the rod, and then the slide 9 which supports the groups of elements *a*, *b*, *c* will be pushed rearwardly against the stop and secured.

The mat box *b* is not a part of this present invention excepting as it functions to shiftably mount the aperture-forming means *c* on the standards and, therefore, only that much of the mat box *b* as contributes to such result will now be described.

The mat box *b* is provided at its edge with a split sleeve 37 engaging one of the standards 10, and is provided diametrically opposite said sleeve with a recess 38 adapted to receive the other standard 10. The split sleeve 37 is provided with a screw 39 to contract the sleeve upon the rod so as to hold the mat box in any position to which it may be vertically adjusted on the standards. The sleeve 37 and its associated rod 10 constitute a hinge for the mat box so that said mat box may be swung out of alinement with the lens of the camera.

To hold the mat box against swinging on its hinge it is provided with a set screw 40, having its inner end projecting into the recess 38 and engaging the associated standard 10.

The mat box *b* is provided with a sleeve 42 having a circumferentially extending slit 43 and adjacent thereto a transversely extending slot 44 so that the sleeve can be contracted. The sleeve 42 is provided with ears 45 through which extends a clamping screw 46 for contracting the sleeve.

The iris diaphragm is constructed as follows: There is provided a diaphragm-leaf carrier 47, to which is pivoted at one end at 48 the diaphragm leaves 49, each of which carries at its other end a pin 50 engaging a radial slot 51 in an operating ring 52, so that turning of the ring 52 will swing the leaves 49 in or out to reduce or increase the size of the diaphragm aperture. This construction is old and is well understood in the art relating to iris diaphragms. The operating ring 52 is provided with a radially extending handle 53 that is shiftable in an arc directly in front of an arcuate plate 54 provided with graduations 55 to indicate different sizes of the aperture of the diaphragm according to the particular graduation with which the handle 53 registers. The plate 54 is provided with an arcuate slot 56 in which are positioned adjustable stops 57 which limit the length of the arc through which the handle 53 may be moved. The stops 57 may be adjusted to different positions along the plate 54 to determine the maximum and minimum apertures of the iris diaphragm when it is stationary or operated to produce fade-ins and fade-outs in a manner well understood in motion picture photography.

The operating ring 52 is provided on its periphery with spur gear teeth 58 engaged by a spur pinion 59 mounted on a stud 60 which is screw-threaded into the ring 47. Connected with the pinion 59 is a bevel gear 61 meshing with a bevel pinion 62 fixed to a shaft 63. The shaft 63 is journaled in a bearing 64 and is provided at its outer end with an operating knob 65, the knob being provided with a longitudinal slot 66 engaged by a pin 67 projecting from the shaft 63 so that the knob can be detached from the shaft when desired. Turning of the knob 65 is resorted to when the operator desires to produce relatively slow fade-ins and fade-outs, and when relatively quick fade-ins and fade-outs are desired the operator will actuate the handle 53. The difference in the speed with which the diaphragm leaves are operated is of course partly due to the fact that the handle 53 is directly connected with the operating ring, whereas the operating knob or fly wheel 65 is connected with said ring through reduction gearing.

The bearing 64 is fastened by screws 68 to the carriage 47. An annular plate 69 is fastened by screws 70 to the carriage 47 to form a flange overlapping a portion of the operating ring 52 so as to hold said ring in place and permit the same to turn. The rear face of the carriage 47 near the periphery thereof is provided with a rack 71 engaged by a spur pinion 72 fixed to a shaft 73 which is journaled in a bearing 74 that is fastened to the rear face of a rotative member 75 having a central opening 76 registering with a central opening 77 in the carriage 47 and with the bore of the ring 52. The shaft 73 is turned by an operating knob or fly wheel 78, which is provided with a longitudinal slot 79 engaged by a pin 80 projecting from the shaft so that the knob can be detached from the shaft when so desired. Turning of the knob 78 shifts the carriage 47 relative to the member 75 so that the diaphragm may be moved to positions eccentric of the camera lens. The carriage 47 slides in a channel 81 formed in the member 75 and a retaining ring 82 is fastened to the member 75 by screws 83 to hold the carriage 47 in place on the member 75 and permit of sliding of said carriage.

Means are provided to yieldingly hold the carriage 47 against shifting and, in this instance, said means comprise friction-producing elements and is constructed as follows: Fastened by screws 84 to the carriage 47 is a bracket 85 in which is mounted a flat spring 86 arranged in alinement with the member 75, the ends of the spring 86 being provided with shoes 87 formed of leather or other suitable friction-producing material and bearing against the edge of the member 75. When the knob 78 is turned to shift the carriage 47 the shoes 87 rub upon the member 75 so as to yieldingly hold the carriage in any position to which it is moved. When desired the carriage 47 may be secured against movement by a set screw 88 screw-threaded through the bracket 85 and bearing against the edge of the member 75. The member 75 carries a thimble 89 which fits inside of the sleeve 42 of the mat box, the clamp 46 securely clamping the thimble 89 to the mat box. By loosening the screw 46 the member 75 may be rotated relative to the mat box and this together with sliding of the carriage 47 to different positions shifts the diaphragm aperture to different positions to admit light rays to any desired portion of the film being exposed in the camera.

Figure 1:
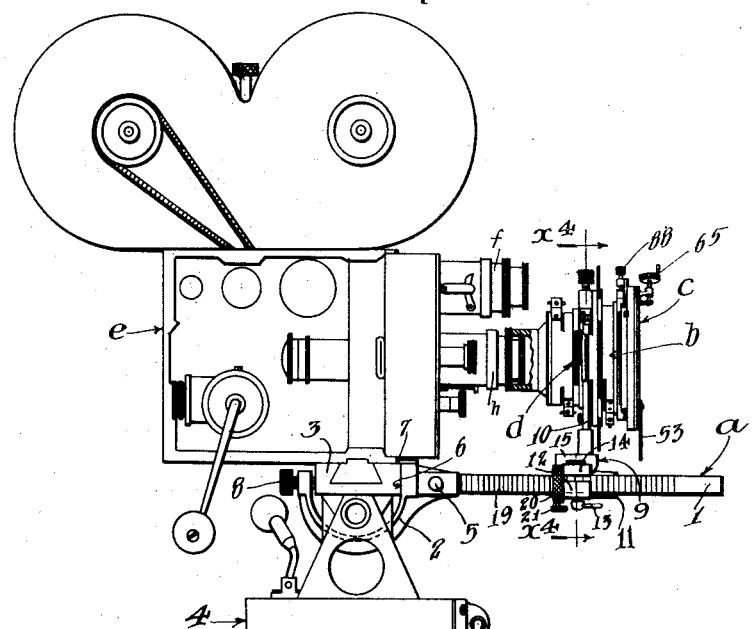
Figure 1 is a side elevation of a motion picture camera equipped with the invention and mounted on a tripod, the upper portion only of which is shown. The coupling sleeve of the attachment is shown partly in section.
Figure 2:
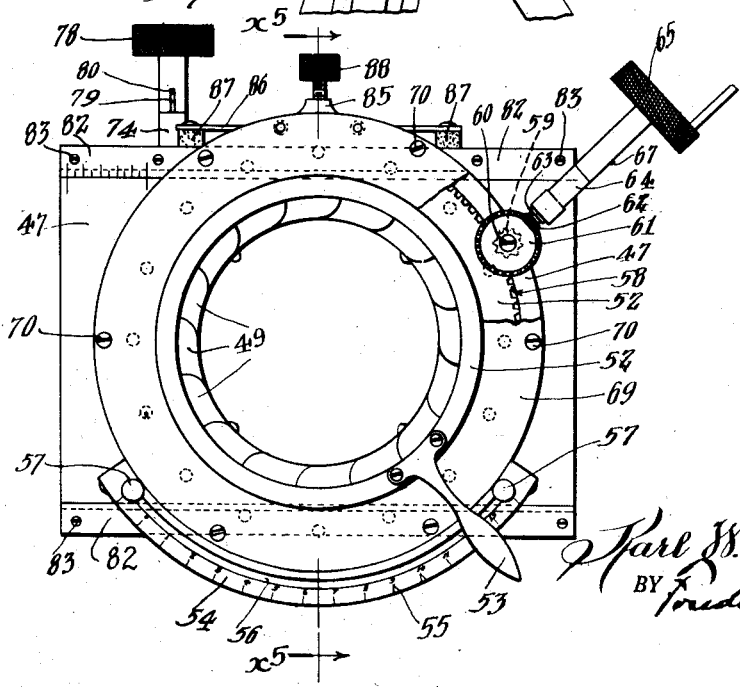
Fig. 2 is an enlarged front elevation of the attachment shown in Fig. 1, a portion of the operating-ring retaining flange being broken away to expose some of the gear teeth of said ring.
Figure 3:
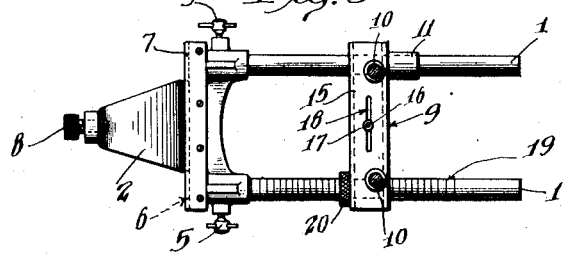
Fig. 3 is a plan view of the attaching bracket, the standards being shown in cross section.
Figure 4:
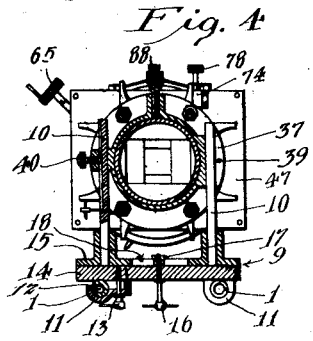
Fig. 4 is an elevation partly in section on line indicated by $X^4$—$X^4$ Fig. 1.

To use the invention, assuming that it is assembled with the tripod and camera as shown in Fig. 1 of the drawings, if the photographer desires to produce a relatively fast fade-in or fade-out in the central portion of the frame, while operating the camera he will turn the handle 53 from left to right looking toward the front of the camera or from right to left. To produce the fade-in or fade-out slowly, he will turn the handle 65 instead of the handle 53. If he desires to produce the fade-in or fade-out at a portion of the frame eccentric to the center thereof, he will loosen the clamping screw 46 and turn the diaphragm mounting within the sleeve 42 and he will also turn the knob 78 to shift the member 47 laterally with respect to the member 75. The member 47 may thus be moved to any position that may be effected by compounding the two movements.

When it is desired to either change the lenses of the camera, which is effected in the camera illustrated by rotation of the turret plate as is well understood in the art, or to employ the camera without using the attachment, the operator will loosen the screw 40 and swing the mat box upon its pivot, formed by one of the standards 10, forwardly and sidewardly away from the lens barrel. It may be necessary before swinging the mat box to loosen the clamping screw 13 and shift the slide 9 forwardly. The parts may be quickly returned to their former positions because of the provision of the stop 20, all that is necessary being to swing the mat box into position to cause the recess 38 to engage the associated standard 10, tighten the screw 40 against said standard and then move the slide 9 rearwardly until it engages the stop 20.

The attachment may be readily adjusted to the lens barrels of different cameras, the vertical adjustment being effected by loosening the screw 39 and moving the mat box along the standards 10, and the lateral adjustment being effected by loosening the screw 16 and sliding the member 15 upon the member 14.

I claim:

1. In an attachment of the character described, a rotatively mounted member having an opening, a carriage shiftably mounted on said member, dissolve means on the carriage, means to shift the carriage, and means to operate the dissolve means.

2. In an attachment of the character described, a rotatively mounted member having an opening, a carriage shiftably mounted on said member, an operating ring rotatively mounted on the carriage, diaphragm leaves forming an aperture and operative by rotation of the operating ring to change the size of the aperture, a handle projecting from the operating ring, and other means than the handle including speed reduction gearing to rotate the ring.

3. In an attachment of the character described, a bracket provided with means to attach it to a tripod, a slide having a member shiftably mounted on the bracket and having a second member mounted to shift longitudinally on the first member, standards mounted on the second slide member, and aperture-forming means shiftably mounted on the standards.

4. In an iris diaphragm, a diaphragm-leaf carrier, diaphragm leaves pivoted to said carrier, a ring operatively connected with the leaves and provided with gear teeth, a gear engaging the teeth on the ring, and a fly wheel operatively connected with said gear.

5. In an iris diaphragm, a diaphragm-leaf carrier, diaphragm leaves pivoted to said carrier, a ring operatively connected with the leaves and provided with gear teeth, a gear engaging the teeth on the ring, a fly wheel operatively connected with the gear, and an operating handle connected with the ring.

6. In an iris diaphragm, a diaphragm-leaf carrier, diaphragm leaves pivoted to said carrier, a ring operatively connected with the leaves, a fly wheel geared to the ring, and an operating handle connected with the ring.

7. In an iris diaphragm, a diaphragm-leaf carrier, diaphragm leaves pivoted to the carrier, means to operate said leaves, a member shiftably supporting the carrier, a rack on the carrier, a gear engaging the rack, a shaft to turn the gear journaled on the carrier-supporting member, and means to turn the shaft.

8. In an iris diaphragm, a diaphragm-leaf carrier, diaphragm leaves pivoted to the carrier, means to operate said leaves, a rotatively mounted member shiftably supporting the carrier, a rack on the carrier, a gear engaging the rack, a shaft to turn the gear journaled on the carrier-supporting member, and means to turn the shaft.

9. In an iris diaphragm, a diaphragm-leaf carrier, diaphragm leaves pivoted on the carrier, means to operate the leaves, a member shiftably supporting the carrier, means to shift the carrier on its support, and friction-producing means yieldingly holding the carrier against shifting.

10. In an iris diaphragm, a diaphragm-leaf carrier, diaphragm leaves pivoted on the carrier, means to operate the leaves, a member shiftably supporting the carrier, means to shift the carrier on its support, and a friction shoe yieldingly mounted on the carrier and engaging the carrier-supporting means.

11. In an iris diaphragm, a diaphragm-leaf carrier, diaphragm leaves pivoted on the carrier, means to operate the leaves, a member shiftably supporting the carrier, means to shift the carrier on its support, a spring connected between its ends to the carrier, and friction shoes mounted on opposite ends of the spring and engaging the carrier-supporting means.

12. In combination, a bracket adapted to be attached to a tripod, standards connected with the bracket, a diaphragm-leaf carrier swingingly connected with one of the standards and releasably connected with the other standard, diaphragm leaves pivoted to the carrier, and means to operate the leaves.

13. In an attachment of the character described, a bracket provided with means to attach it to a tripod, a slide having a member shiftably mounted on the bracket and having a second member mounted to shift longitudinally on the first member, and aperture-forming means mounted on the second slide member.

14. In combination, a bracket adapted to be attached to a tripod, standards connected with the bracket, and aperture-forming means mounted to swing on one of the standards and releasably connected with the other standard.

Signed at Los Angeles, California, this 20th day of October, 1920.

KARL W. THALHAMMER.

Witnesses:
GEORGE H. HILES,
L. BELLE WEAVER.